No. 723,230. PATENTED MAR. 24, 1903.
J. H. BELZ.
PNEUMATIC BRANDING AND HEATING IRON.
APPLICATION FILED MAY 26, 1902.
NO MODEL.
2 SHEETS—SHEET 1.
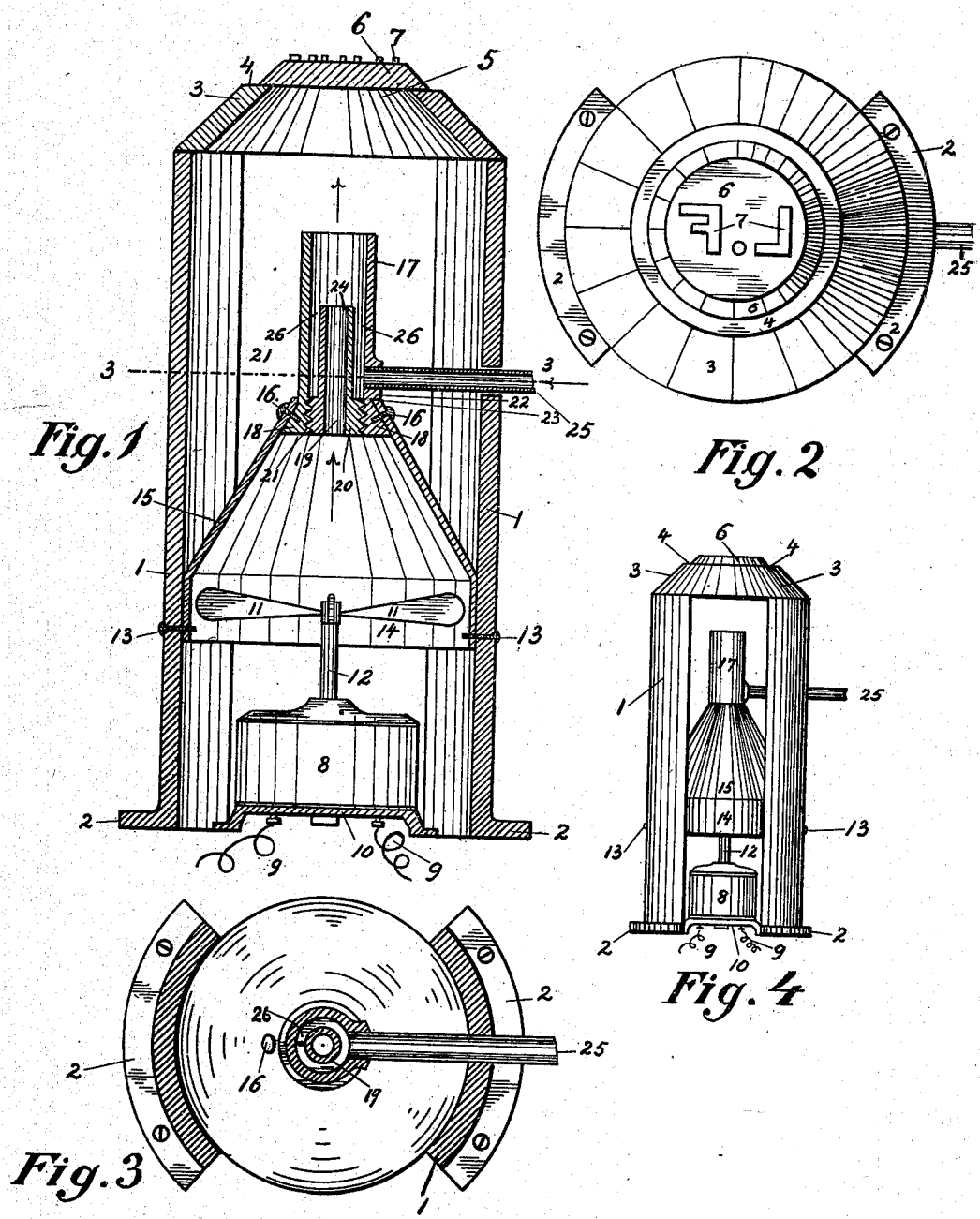
WITNESSES:
INVENTOR:
John H. Belz,
BY
Hugh K. Wagner
His ATTORNEY No. 723,230. PATENTED MAR. 24, 1903.
J. H. BELZ.
PNEUMATIC BRANDING AND HEATING IRON.
APPLICATION FILED MAY 26, 1902.
NO MODEL. 2 SHEETS—SHEET 2.
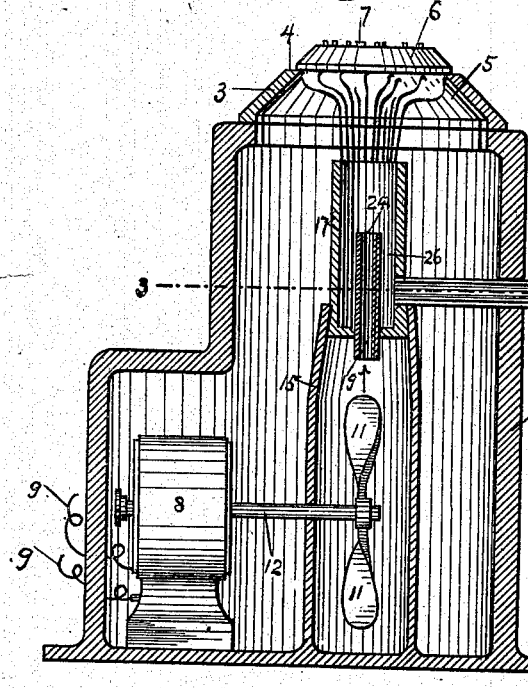
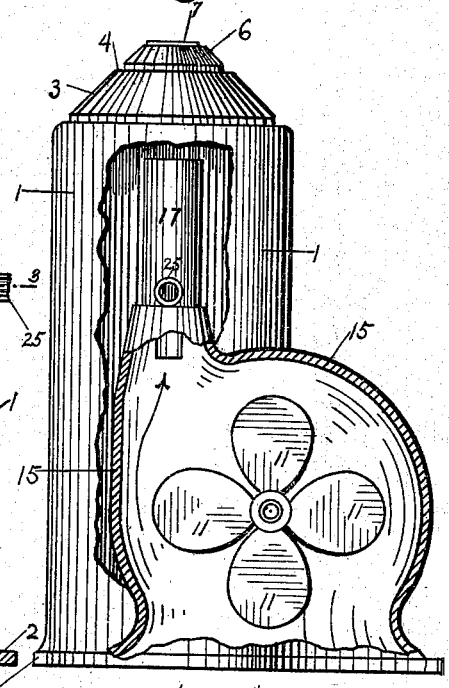
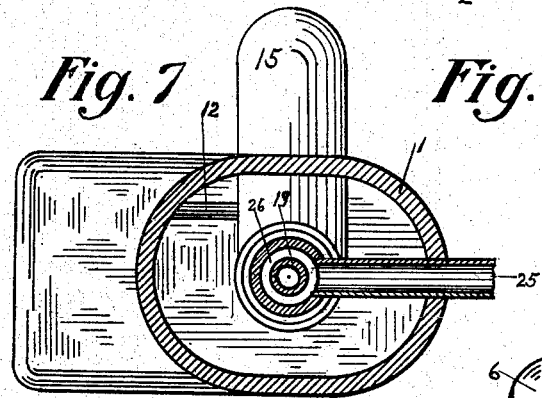
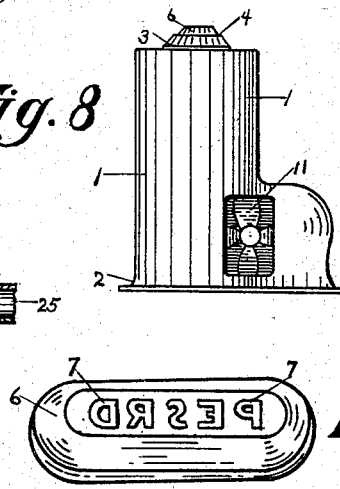
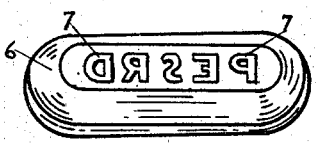
WITNESSES:
Carl Kampp
Maud E. Letcher
INVENTOR:
John H. Belz
BY
Hugh K. Wagner
His ATTORNEY.

UNITED STATES PATENT OFFICE.

JOHN H. BELZ, OF ST. LOUIS, MISSOURI, ASSIGNOR OF ONE-HALF TO BEN STEYERMARK, OF ST. LOUIS, MISSOURI.

PNEUMATIC BRANDING AND HEATING IRON.

SPECIFICATION forming part of Letters Patent No. 723,230, dated March 24, 1903.

Application filed May 26, 1902. Serial No. 108,944. (No model.)

*To all whom it may concern:*

Be it known that I, JOHN H. BELZ, a citizen of the United States, residing at the city of St. Louis, State of Missouri, have invented certain new and useful Improvements in Pneumatic Branding and Heating Irons, of which the following is a full, clear, and exact specification, such as will enable others skilled in the art to which it appertains to make and use the same.

This invention relates to the details of construction hereinafter described providing for the more easy, effectual, and convenient method of heating a branding-iron. The branding-iron is so arranged that it could also be used for other purposes. For instance, it might be used as a rest on which could be placed dry-plates in a dry-plate factory to be heated and dried. Other similar uses are possible; but I shall describe it as used for branding purposes.

In the drawings, Figure 1 is a view, partly in section, showing the relative arrangement and location of the several parts of my device. Fig. 2 is a top plan view of the same. Fig. 3 is a view, partly in section, taken on the line 3 3, Fig. 1. Fig. 4 is a front view of my device. Figs. 5, 6, 7, 8, and 9 illustrate a modified form of construction.

In the drawings, 1 is the casing, having the flange 2 at its base in order to make it rest steadily upon the ground. Said casing is conical at the top 3, said conical portion being cut away and having a flat portion 4 surrounding the circular opening 5, the branding or heating iron 6 resting on said flat portion 4. When said iron 6 is used for branding purposes, it will have the embossed portion 7; but when it is used as a heating-iron it will of course be made smooth or flat. Within said casing 1 at its bottom is located an electric motor 8, with the usual and necessary electrical connections 9 and resting upon the frame 10. Projecting above said electric motor is a fan 11, actuated from said motor 8 by means of the shaft 12.

The fan 11 is located within a cylinder arranged within the casing 1 and at its lower portion attached to the walls of said casing 1 by the bolts or pins 13, which act as supports therefor, said cylinder being numbered 14. The cylinder 14 terminates at its upper end in a cone-shaped portion 15, which has fastened within its smaller end by the bolts or pins 16 a cylindrical member or pipe 17, hereinafter designated as the "burner." Said burner 17 at its lowest portion is screw-threaded internally and has a flared portion 18 abutting against the inner walls of the conical portion 15. Within said burner 17 is a pipe 19, having a portion at its bottom larger than the main portion of the pipe, said extended portion being numbered 20 and by screw-threads 21 fastened within the burner 17, said screw-threads 21 coöperating with similar screw-threads, before mentioned, within the burner 17. The burner 17 is not only fastened to the conical portion 15, but has a shoulder 22, which abuts over and rests upon the end portion 23 of the conical portion 15, so as to afford an additional means of support. The pipe 19 affords means of egress for air propelled into the conical portion 15 by the fan 11, and at the point in the burner above the mouth of the pipe 19 indicated by the numeral 24 said air mixes with the gas or gasolene-vapor, which enters through the pipe 25 and fills the passages 26 in the burner 17, surrounding said pipe 19. When the burner 17 is lighted, the flame therefrom, as from a Bunsen burner, heats the plate 6. It will be seen that the construction hereinbefore described provides a compact, convenient, and novel device of the character mentioned.

The motor and fan can be arranged, as shown in Figs. 5, 6, 7, and 8, with the shaft 12 extending horizontally instead of vertically and elongated to pass through a plurality of casings such as described and which will make it possible to mount a number of fans on said shaft, thus operating the entire device in multiple to any desired number.

Having thus described my said invention, what I claim, and desire to secure by Letters Patent, is—

1. In a device of the character described, the combination of a casing, a conical portion located within same, a fan beneath said conical portion, an air-outlet from said conical portion, a pipe surrounding said air-outlet, an opening thereinto from a gas-supply, and a conical portion at the top of said casing on which a branding-iron may be supported.

2. In a device of the character described, the combination of a casing having flanges at its bottom and slanting portions at its top; flat portions on the top of the sides of said slanting portion; on which a branding-iron may be supported; a frame 10; a motor supported by said frame; a shaft projecting from said motor; a fan actuated by said shaft; a conical portion located adjacent to said fan; a pipe forming an air-exit from said conical portion; a pipe surrounding said air-exit pipe and containing a gas-inlet; and means for supporting said air-exit pipe within the surrounding pipe containing the gas-inlet, substantially as described.

3. In a device of the character described, the combination of the casing on which a branding-iron may be supported; a motor; a fan actuated by said motor; a conical portion located adjacent to said fan; a pair of pipes in which said conical portion terminates, one located within the other, and being the shorter of the two, and the outer one containing a gas-inlet; substantially as described.

In testimony whereof I have hereunto attached my signature, in the presence of two witnesses, this 19th day of May, 1902.

JOHN H. BELZ.

Witnesses:
BEN STEYERMARK,
MAUD E. LETCHER.